S. Z. DE FERRANTI.
VEHICLE WHEEL.
APPLICATION FILED NOV. 14, 1907.

964,632.

Patented July 19, 1910.

ATTEST.

INVENTOR.
SEBASTIAN Z. DE FERRANTI

ATTYS.

UNITED STATES PATENT OFFICE.

SEBASTIAN ZIANI DE FERRANTI, OF GRINDLEFORD, ENGLAND.

VEHICLE-WHEEL.

964,632.

Specification of Letters Patent.

Patented July 19, 1910.

Application filed November 14, 1907. Serial No. 402,185.

*To all whom it may concern:*

Be it known that I, SEBASTIAN ZIANI DE FERRANTI, a subject of the King of Great Britain and Ireland, and residing at Grindleford, in the county of Derby, England, have invented certain new and useful Improvements Relating to Vehicle-Wheels, of which the following is a specification.

The invention relates to vehicle wheels and especially to motor vehicle wheels of the type in which the tire-carrying rim can be detached bodily from the collapsed spoke system, in order that the corresponding spare parts carried in readiness may be substituted therefor.

The main object of the invention is to provide a new type of wheel having tension spokes in which the road-side substitution indicated above can be effected more readily and expeditiously than heretofore.

To these ends the invention consists in the improved vehicle wheel hereinafter described, the novel points of which are set forth in the appendant claims.

With a wheel constructed according to my invention, in order to change the rim it is merely necessary to collapse the spoke system without removing the individual spokes, thereby avoiding the necessity of entirely dismantling the wheel and rebuilding it piece by piece.

Figure 1:
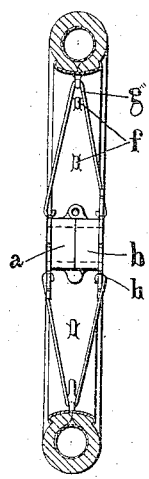
Figure 2:
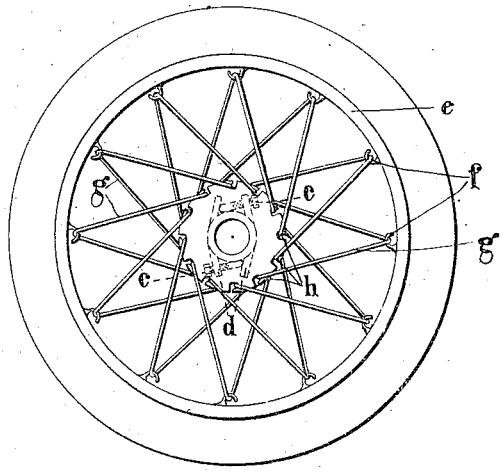
Figure 3:
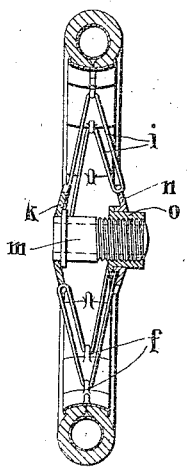
Figure 4:
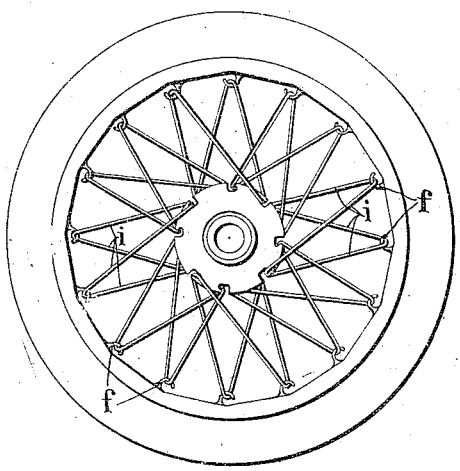
Figure 5:
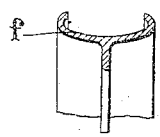

Referring now to the accompanying drawings which form part of the specification, Figure 1 shows a view of one form of the invention partly in section, Fig. 2 being a corresponding side view. Figs. 3 and 4 show similar views of a modified form of wheel, while Fig. 5 shows a cross-section of the rim with projecting hooks, and Fig. 6 a side view of the same showing a method of manufacture.

In carrying the invention into effect according to the form shown in Figs. 1 and 2, the hub consists of two parts, $a$ and $b$, which can be rotated about their common axis by suitable means, such as the set screws, $c$, passing through the lugs, $d$. The rim, $e$, is shown, provided with a number of hooks, $f$, over which spokes or spoke units, $g$, are looped, the ends of the spokes being hooked as at, $h$, to the hub members, $a$ and $b$, respectively.

According to the modification shown in Figs. 3 and 4, the spokes, $i$, take the form of endless wire loops, the rim as before being provided with hooks, $f$. The hub in the present case consists of a disk, $k$, fitting on the screwed hub proper, $m$, and a second disk, $n$, fitting loosely over a screwed sleeve, $o$, engaging with the hub member, $m$, the sleeve $o$, being rotatable by any suitable wrench or the like.

According to the arrangement shown, the endless spokes or spoke units are bent into four loops, two of which are hooked respectively to appropriate parts of the disks, $k$ and $n$, while the other two engage with the hooks, $f$, in the rim. Such spokes are thus tetrahedronic in form, *i. e.* their straight portions correspond in position with four edges of a tetrahedron.

It will be seen that in both modifications the effect of giving relative motion to the hub members with which the spokes engage, is to either strain or relax the spokes. Supposing the rim is to be removed, the spokes are readily disengaged from the rim hooks, their attachment to the hub members however, forming a species of articulation which defines the axis about which they fall away from the hooks, and at the same time insures their returning along the same predetermined paths when the rim is replaced. It will also be seen that the spokes when collapsed are maintained in operative engagement with the hub members in some cases by the hook-like connections, and in others by the spring of the spokes themselves.

As stated above the object aimed at in the above arrangement of tension spokes, is not to dismantle the wheel entirely so that it has to be rebuilt piece by piece, but merely to collapse the spoke system without removing the individual spokes from the hub, so that the rim can be very readily removed or replaced, and the spokes restored to their working position.

Figure 6:
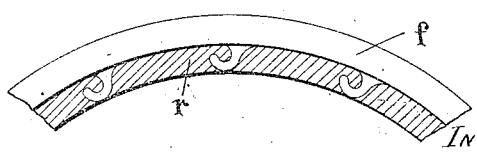

As shown in Figs. 5 and 6, the hooks may be conveniently formed integrally with the rim, the rim being first formed to a uniform Y-section as shown in Fig. 5, sufficient of the web portion $r$, being subsequently removed as shown by the hatched portion in Fig. 6, to leave the hooks outstanding. Moreover, in any of the wheels described, I may make the rim of polygonal shape as viewed laterally (see Fig. 4), that is, I make those parts of the rims between the spoke ends straight instead of circular, this form being better adapted to withstand the stresses to which the rim is subjected.

I wish it to be understood that although

I have described certain examples of my invention in considerable detail, I do not intend to limit myself thereby, since it is evident that the underlying principles of the invention can be embodied in a variety of different forms.

Having now described my invention what I claim as new and desire to secure by Letters Patent is:—

1. In combination in a wheel, a hub having relatively movable members; a rim; a plurality of tension spoke units each movably engaging with each of said hub members at certain symmetrically disposed points, each of said spoke units being rotatable about an axis passing through its points of engagement with said hub members together with means for detachably securing said spoke units to said rim.

2. In combination in a wheel, a hub having relatively movable members; a rim; a plurality of tension spoke units each movably engaging with each of said hub members at certain points, each of said spoke units being rotatable about an axis passing through its points of engagement with said hub members; means for detachably securing said spoke units to said rim together with means for simultaneously adjusting the tension of said spoke units.

3. In combination in a wheel, a hub having relatively movable members; a plurality of tension spoke units each movably engaging with each of said hub members at certain points and a detachable rim having means to engage said spoke units, said spoke units being movable along predetermined paths defined by their engagement with said hub members to register automatically with said rim-engaging means.

4. In combination in a wheel, a hub having relatively movable members; a plurality of tension spoke units each movably engaging with each of said hub members, and a detachable rim having means to engage said spoke units, said spoke units being movable along predetermined paths similarly disposed in relation to the wheel axis and defined by their engagement with said hub members.

5. In combination in a wheel, a hub; a plurality of endless spokes pivotally connected therewith to move in predetermined paths and a rim detachable from said spokes.

6. In combination in a wheel, a two-part hub; a plurality of separate endless spoke units each engaging with the two parts of said hub and a rim detachable from said spoke units.

7. In combination in a wheel, a two-part hub; a plurality of wire spokes each engaging with each of the two parts of said hub and a plurality of like endless spokes 8. In combination in a wheel, a rim; a hub and a plurality of endless spokes, each of which has four bends engaging alternately with said rim and hub.

9. In combination in a wheel, a rim; a hub and a plurality of like endless spokes consecutively spaced around the wheel connecting the same.

10. In combination in a wheel; a two-part hub and a plurality of endless spokes each having a plurality of loops, two of said loops engaging one each with the parts of said hub and two other of said loops engaging with said rim.

11. In combination in a wheel; a rim; a hub and a plurality of endless spokes consecutively disposed around the wheel, each passing a plurality of times between said rim and hub.

12. In combination in a wheel; a rim; a hub and a plurality of endless tension spokes consecutively disposed around the wheel together with means for simultaneously adjusting the tension of said spokes.

13. A wheel having a hub and a rim and a plurality of endless spokes consecutively disposed around said wheel.

14. A wheel having a plurality of endless spokes each with four straight portions disposed in correspondence with four edges of a tetrahedron.

In testimony whereof, I affix my signature in presence of two witnesses.

SEBASTIAN ZIANI DE FERRANTI.

Witnesses:
STANLEY C. PHILLIPS,
LUTHER J. PARR.